United States Patent [19]

Davidson et al.

[11] 4,342,484

[45] Aug. 3, 1982

[54] WELL STIMULATION FOR SOLUTION MINING

[75] Inventors: Donald H. Davidson, Bedford; Ray V. Huff, Acton, both of Mass.

[73] Assignee: Kennecott Corporation, New York, N.Y.

[21] Appl. No.: 604,869

[22] Filed: Aug. 14, 1975

Related U.S. Application Data

[62] Division of Ser. No. 422,239, Dec. 6, 1973, Pat. No. 3,917,345.

[51] Int. Cl.³ .................... E21B 43/26; E21B 43/28
[52] U.S. Cl. ........................................ 299/5; 166/271; 166/280; 166/308
[58] Field of Search ............... 166/307, 308, 271, 274; 299/5, 4

[56] References Cited

U.S. PATENT DOCUMENTS

| | | | |
|---|---|---|---|
| 1,806,499 | 5/1931 | Ranney | 166/307 X |
| 2,789,788 | 3/1957 | Hughes et al. | 166/307 |
| 3,402,966 | 9/1968 | Dahms et al. | 299/4 |
| 3,574,599 | 4/1971 | Ortloff et al. | 299/4 X |
| 3,640,579 | 2/1972 | Lewis | 299/4 X |
| 3,642,068 | 2/1972 | Fitch | 166/307 |
| 3,822,916 | 7/1974 | Jacoby | 299/4 |

*Primary Examiner*—William F. Pate, III
*Attorney, Agent, or Firm*—John L. Sniado; Fred A. Keire

[57] ABSTRACT

Methods for increasing the permeability of a subterranean igneous rock formation penetrated by at least one well where a hydraulic fluid is injected into the formation at a pressure sufficient to cause diffusion into the natural fractures thereof and thus increase the cross-sectional area thereof, maintaining the pressure and injecting a second fluid which results, by the use thereof, in substantially maintaining the increased cross-sectional area after the pressure is reduced.

12 Claims, No Drawings

WELL STIMULATION FOR SOLUTION MINING

This is a division of application Ser. No. 422,239 filed Dec. 6, 1973, now U.S. Pat. No. 3,917,345.

This invention relates to the treatment of undergound deposit-bearing formations. More particularly, it relates to a method for increasing the permeability of such underground formations to enhance or stimulate the recovery of the desired deposits therefrom.

The prior art considered in conjunction with the preparation of this specification is as follows: U.S. Pat. Nos. 2,944,803; 3,285,342; 3,387,888; 3,533,471; 3,561,532; 3,565,173; 3,587,744; 3,593,793; and 3,654,990. All of these publications are to be considered as incorporated herein by reference.

Presently many mineral mines, located throughout the Western United States, are not in a position to be commercially developed because of their low ore concentration and/or because they are located at remote regions which makes them economically unfeasible for conventional type exploitation. Even ore bodies possessing relatively high ore concentration and located in accessible regions may have its valuable deposit at a depth that conventional mining may not be mechanically or economically feasible.

In recent years a process for tapping these underground ore bodies, in-situ, has evolved which has resulted in recovering some mineral values which were formerly considered inaccessible by conventional mining techniques. The process consists mainly of drilling a well into an underground ore deposit and then introducing a leaching solution to contact the ore therein. The leaching solution dissolves the mineral within the ore deposit and thereafter the pregnant solution is recovered and processed by conventional extraction means to recover the particular mineral values therefrom.

In conjunction with this in-situ solution mining, it is known in the art that various ores, for example, chalcopyrite and most other primary sulfide minerals, are not effectively dissolved by the leaching solution or the rate of withdrawal solution from the ore body is slow because of the low permeability of the formation and thus such process is impractical.

It is also known in the art that the recovery of minerals and fluids from underground formations of relatively low permeability can be enhanced by fracturing the formation rock to create areas of high permeability. One commonly employed technique for fracturing such formations is hydrofracturing. In this technique, a fracturing fluid is injected into the formation through a wellbore at a pressure above the formation breakdown pressure. The fracture initiates at the wellbore and hopefully propagates outward into the formation in a radial manner. While this technique is generally useful, one serious problem is encountered. If, after the fracture has reached the desired limits, the pressure is substantially reduced, the fracture settles back into place preventing the desired circulation of leaching solution and/or solvent. If, on the other hand, sufficient pressure is maintained to keep the fracture open until sufficient material has been dissolved to provide a definite flow channel, the fracture continues to extend beyond the desired limits. Thus, the fracture may extend outside the treatment zone to a porous formation which creates a problem of leakage from the solution mining operation.

The aforementioned disadvantages inherent in the prior art processes are now overcome by practicing the processes of the present invention.

Accordingly, it is an object of the present invention to provide an improved method for stimulating the recovery of materials from underground deposits.

It is another object of the invention to provide an improved process for increasing the permeability of igneous rock formations.

It is another object of the invention to provide for increasing the cross-sectional area of natural fractures in the formation around a wellbore.

It is a further object of the invention to provide a process for maintaining the increased cross-sectional area of natural fractures once said fractures are initially opened.

It is a further object of the invention to provide a process for increasing the amount of copper metal recovered from solution mining of igneous rock formations containing chalcopyrite.

These and other objects of the present invention will be readily apparent in conjunction with the description of the present invention hereinafter set forth, including the appended claims.

The objects of the present invention are preferably accomplished by a process in which prior to any hydrometallurgical operation being conducted on the underground deposits, there is injected into the formation, via the well, a hydraulic fluid at a pressure sufficient to cause diffusion of said fluid into the natural fractures of the formation but below pressure at which new fractures would be formed in the formation and which consequently causes the fracture to increase in at least the cross-sectional area thereof. While maintaining said pressure, a second fluid is injected into said natural fractures via said well. The second fluid is of such character that it causes the increased cross-sectional area of the natural fractures to be substantially maintained after the pressure is reduced. In this manner it has unexpectedly been found that the permeability of the formation can be substantially increased without incurring any of the prior art disadvantages including high pressures needed for initiating new fractures which present engineering and safety problems. Thus, the natural fractures of the formation are treated to produce the desired end result and there is no need for conducting a "fracturing" operation, i.e. to produce new fractures in the formation, which requires substantial time, money and effort. For example, the use of explosives implanted in crevices, cracks, or fissures is common in mining and quarrying operations. Such explosives have included both solid and liquid-type explosives. The detonation of an explosive device or materials in a wellbore to achieve explosive fracturing of the surrounding formation, however, suffers from the same disadvantage noted above with respect to hydrofracturing operation, in addition to the difficulty of propagating the fracture at increasing distances from the injection wellbore. Explosive fracturing by the detonation of an explosive device in a wellbore also requires a subsequent clean up operation before recovery of operations can be begun at that wellsite, increasing both the time and expense involved in such a treating action. Explosive fracturing also presents numerous safety problems; it has been experienced in the past that several people have been killed in conjunction with the utilization of explosives for carrying out the desired end result; i.e., fracturing underground formations.

The hydraulic fluid is any liquid which is capable of being pumped at below fracturing pressures. It is to be understood that the term "hydraulic fluid" is not intended to mean that it creates new fractures, since the inventive concept herein is the use of such fluid (and a second fluid hereinafter defined) to dilate natural fractures without creating any substantial new fractures. However fluids known in the art as "fracturing fluids" or "hydraulic fracturing fluids" may be used without departing from the scope of the invention, it being understood that the process claimed herein operates below the fracturing pressure of the ore body. Although a solvent for the metal values in the formation can be used, preferably the initial opening will be made with a non-solvent. Thus, suitable fluids, hydraulic or fracturing, include alcohols and glycols, water and brine or any other organic or inorganic liquid which meets the requirements of being pumpable at the necessary pressure. In most cases, the preferred fluid will be water or water saturated with the material of the formation being treated. It is within the skill of the art to add thickening agents, fluid loss additives, corrosion inhibitors, bactericides and the like to the fluid when desired.

The second fluid which is used, in the present invention processes, is either an aqueous slurry containing a propping agent or a solution, acidic or alkaline, hereinafter referred to as reactive solution, which is capable of reacting with the rock formation via corrosion, dissolution and/or oxidation to increase at least the cross-sectional area of the natural fractures, and in some cases the length thereof by relatively short distances.

Suitable propping agents include sand, glass beads, resin beads such as polyethylene or other polymeric beads, metallic pellets such as aluminum pellets, walnut hulls or shells, ceramics, and the like.

The propping agent can be added initially with the hydraulic or fracturing fluid, but will preferably not be added until the opening is increased.

It is desirable to control the particle size of the propping agent since the purpose thereof is to provide effective propping and/or to prevent sealing of the natural fractures. For example, a U.S. Sieve Size of between about 12 and 40 mesh would be quite suitable. This is not a critical feature and thus the mesh size should be determined based upon the material used, solution flow rates desired, economics and the like. Likewise, the quantity of the propping agent in the aqueous slurry is ascertainable in a similar fashion with the only restraint being that the slurry must be pumpable. Sand, for example, can be used in a weight range of about 1 to 5 percent based on the total weight of said slurry.

The reactive solution, i.e. one of the above described "second fluids", can be any acidic solution which has a pH of less than 6.5, preferably less than 2.0 and more preferably in the range of from about 0.5 to about 1.5 and which is reactive with the rock formation. The acids which can be used include, without limitation, HF, HCl, $H_2SO_4$, and mixtures thereof. "Mud acid", i.e. an aqueous solution containing 3% by weight HF and 13% by weight HCl, is a preferred "second fluid". The acidic solution may also comprise or contain an oxidizing agent such as water soluble ferric salts like ferric sulfate. For example, see U.S. Pat. No. 3,574,599. Another preferred "second fluid" is a mixture of $H_2SO_4$ and $Fe_2(SO_4)_3$, a one molar solution and one-half molar solution respectively.

The reactive solution may also be alkaline such as an ammoniacal solution. For example, see U.S. Pat. No. 3,278,232.

The pressure used to pump the hydraulic or fracturing fluid and/or the second fluid into the natural fractures is any pressure which does not cause any substantial new fracture formation and is usually less than about 1.0 pounds per square inch gauge (psig) per foot of well depth. Thus, the pressures can easily be within a range of about 1,000 psig to about 10,000 psig with wells of 1,000 to 10,000 feet deep. It is to be understood then that the pressure is a critical feature of the present invention in order to obtain the desired end results.

In the practice of this invention for the stimulation of underground formations to increase their fluid productivity and/or permeability, a hydraulic or fracturing fluid is placed in a well penetrating the formation to be treated, optionally through the piping, adjacent and in contact with the face of the formation to be treated. If desired or required, packing is employed to isolate and confine the fracturing fluids to a portion of the well exposing the formation to be treated. Pressure is then applied via the hydraulic fluid so as to build up the pressure on the formation exposed to the hydraulic fluid to a value great enough to cause diffusion into the natural fractures.

The time required to pump the hydraulic fluid will depend upon several variables including, without limitation, initial permeability, size of formation being treated, type fluid used and the like. When the pump pressure indicates a pressure just below fracturing pressure of the formation for the depth of the well, then the second fluid is injected for a sufficient period of time for the propping agents to be positioned or for the reacting solution to react with the sides of the fractures. Again, these times will vary depending upon several variables and can range, for example, between about 30 minutes to about 10 hours.

While the above process has been described with reference to the use thereof as a preliminary treatment of a formation prior to solution mining, it is within the scope of the present invention that an operating well could be "shut down" and treated in this fashion in order to increase the permeability thereof.

The processes of the present invention are uniquely effective in conjunction with the in-situ mining of underground igneous rock formations which contain copper metal values in the form of chalcopyrite and pyrite ores. It has been found that the stimulation of a low permeability deposit is an important factor for an economically viable in-situ mining operation. In the particular case relating to the underground (or solution) mining of chalcopyrite and pyrite ores, this stimulation permits the leaching solvent to contact more of the copper minerals, thus increasing both the leach efficiency and copper loadings. Both of these parameters are critical for economically mining deep-lying low grade copper ores by in-situ mining techniques.

Subsequent to the above described stimulation process, the copper leaching solution is injected in order to subsequently recover the copper values. The copper leaching procedures can be carried out in any manner known to those skilled in the art of in-situ mining such as those procedures described in U.S. Pat. Nos. 3,278,232; 3,574,599; 3,640,579; and 3,708,206, all of which publications are incorporated herein by reference.

It is to be understood that the stimulation process can be used at any time where one so desires. Preferably the hydraulic fluid is used as a pretreatment of the formation or deposit. However, it is also within the scope of the invention that said fluid can be employed where deposits have already been subjected to hydrometallurgical operations.

It is a preferred embodiment of the present invention to utilize the process for the solution mining of copper from subterranean formations in a particular pattern design of injection and production wells. It is preferred that the injection and production wells either be drilled in concentric patterns about each other with a single production well contained within the center of the pattern, for example a five-spot, or that the injection and production wells be drilled in offsetting line patterns so as to form a line drive mechanism within the copper formation. Generally, the distance between the injection and production wells will be from 20 to 1,000 feet, with particular depth, thickness, permeability, porosity, water saturation of the formation, and economic value of the copper mineral contained therein being the engineering constraints upon which the design of the solution mining patterns are based. Therefore, through patterned well completion in the copper formation, the process may be used sequentially across the copper deposit through a series of line drive wells or concentric pattern wells so that the entire copper deposit may be leached.

EXAMPLE I

An ore body 100 acres in area and averaging 500 feet in thickness lies at an average depth of 4,000 feet below the surface of the earth in Arizona. Samples of the ore shows that it is composed primarily of granitic igneous rock and that it contains chalcopyrite as the principal copper mineral. The ore samples also show that it contains approximately 1.4 weight percent chalcopyrite and that the total copper content of the ore averages 0.5 percent. The volume of ore in the deposit is, therefore, $10^4$ acre-feet or $4.356 \times 10^8$ cubic feet. The specific gravity of the granitic ore is 2.6. Therefore, the total weight of the ore in the deposit is $3.54 \times 10^7$ tons, and the copper content of the ore body is $3.54 \times 10^8$ pounds.

Approximately 5 wells (each 4500 feet deep) are drilled into the ore body in an array such as to provide a five-spot pattern, and the wells are completed (sealed and cased to 4,000 feet) such that fluids may be either injected or produced from individual wells. By measurements on core samples and by injection and production tests on individual wells, it is determined that the void volume within the randomly-oriented fracture system is equivalent to 2 percent of the bulk ore volume, that the fracture spacing averages 6 inches, and that the permeability of the ore body to liquid averages about 25 millidarcys.

Petrographic examination of core samples taken from the ore body shows that about 2 percent of the rock surface area exposed by the fractures is covered by the chalcopyrite mineral and that the rock matrix bounded by the fracture system is substantially cubical in configuration.

Thus, the surface-to-volume ratio of the ore blocks bounded by the fractures is approximately equal to that for cubically shaped blocks and the surface area to volume ratio for the ore blocks is equal to 6/L, where L is the length of the side of a cube. In this case L=0.5 feet, and the surface area to volume ratio is equal to 12 square feet/cubic foot.

The total surface area of ore exposed by the fracture network is equal to $12/4.356 \times 10^8$ or $5.227 \times 10^9$ square feet. The surface area of the chalcopyrite mineral exposed by the fracture system is equal to 2 percent of the total surface area, or $1.045 \times 10^8$ square feet.

Laboratory tests within the ore samples showed that ferric sulfate solutions will dissolve copper from the chalcopyrite of the ore body at a rate equal to 0.0002 pound of copper per square foot of chalcopyrite surface area per day. The initial maximum rate of copper production attainable from the ore body by in-situ leaching with ferric sulfate would be $0.002 \times 1.045 \times 10^8 = 209,000$ pounds of copper per day. The laboratory tests also showed that, by allowing a 0.4 molar solution of ferric sulfate to react completely with the chalcopyrite and other minerals in the ore, a pregnant leaching solution containing 3.0 pounds of copper per barrel (42 gallons) could be obtained. Therefore, in order to supply 0.4 molar ferric sulfate solution to the ore body at the optimum rate; i.e., at the rate sufficient to produce the maximum amount of copper and at the same time allow total reaction of the ferric iron, the 0.4 molar ferric sulfate solution must be injected initially at a rate equal to 69,700 barrels/day. The required average residence time for the solution within the ore body is fixed by the injection rate and the void volume of the ore body:

$$\text{Average Residence time} = \frac{\text{void volume}}{\text{injection rate}} = \frac{(0.02)(4.34 \times 10^8) \text{ cubic feet}}{(69,700 \text{ bbl./day})(5.615 \text{ cu. ft./bbl.})} = 22.2 \text{ days}$$

The injection and withdrawal rates of the wells is thus regulated to permit the ferric sulfate solution to remain in the ore body for approximately 22 days.

Utilizing the above set of conditions, the wells are operated for a sufficient period of time to reach equilibrium and the copper produced averages about 187,000 pounds per day.

The injection of the leaching solution is then terminated and a hydraulic fluid (water) is pumped into the natural fractures for a period until the pressure reaches about 3,150 psi. While maintaining this pressure, an aqueous slurry containing two (2) percent by weight sand is injected into each well for approximately 4 hours at the same pressure 3,150 psi. After this 4-hour period, the wells remain inoperative for 30 minutes and then the leaching treatment is initiated under the same conditions specified heretofore. After equilibrium has been established, it is determined that copper is now being produced at an average rate of 235,000 pounds per day. Thus, the use of the present invention stimulation process has resulted in a 25% increase in production directly as a result of the enlargement of old fractures without attempting to create new or artificial fractures within the ore body.

EXAMPLE II

Examples I above is repeated in toto with the exception that "mud acid" is used in place of the aqueous slurry of sand in order to enlarge the natural fractures. Substantially the same magnitude of increase in copper production is obtained as that obtained using said sand slurry.

While Examples I and II have been described as applicable to the copper sulfide ores, it should be understood that the process is also applicable to ores bearing native copper and also to ores of copper oxides and silicates where the copper is present in the cuprous valence state. When the copper is present in its elemental or lower valence state, it is susceptible to oxidation by ferric iron to form solutions of cupric sulfate.

It should also be understood that while it is preferred to conduct the process in an ore body between an input and withdrawal well, a single well process is also included within the scope of the invention. In a single well process, the leaching solution will be injected through a well, permitted to remain in contact with the ore body for a period of time, and then withdrawn through the same well. The pregnant leaching solution is then passed to a copper recovery stage, a regeneration stage and ultimately reinjected.

While the processes have been described as particularly effective in the in-situ mining of copper-bearing deposits, it is also within the scope of the present invention to treat other types of mineral-bearing deposits which contain, for example, nickel, silver, gold, molybdenum, uranium and the like.

The present invention has been described herein with reference to particular embodiments thereof. It will be appreciated by those skilled in the art, however, that various changes and modifications can be made therein without departing from the scope of the invention as presented.

What is claimed is:

1. A method for increasing the permeability of a metal value containing subterranean igneous rock formation penetrated by at least one well which extends from the surface of the earth into the formation comprising the steps of injecting, at a pressure below the pressure producing new fractures in the formation, a hydraulic fluid through said well into the subterranean igneous rock formation at a pressure sufficient whereby said fluid diffuses into natural fractures in the igneous rock formation surrounding said well and causes said natural fractures in the igneous rock formation surrounding said well to increase in at least the cross-sectional area thereof; and, while maintaining said pressure, injecting as a second fluid a fluid, selected from the group consisting of a propping fluid and a propping fluid in combination with an acidic solution, an alkaline solution, oxidizing agents, and mixtures thereof wherein the injecting is into said natural fractures through said well whereby the use of said second fluid substantially results in maintaining the increased cross-sectional area of said natural fractures after the pressure is reduced.

2. The method as set forth in claim 1 wherein the subterranean igneous rock formation contains copper metal values.

3. The method as set forth in claim 1 wherein the hydraulic fluid is water which is injected into said well of from 1,000 to 10,000 feet deep at a pressure of from about 1,000 psig to about 10,000 psig per foot of well depth, and below the pressure producing new fractures in the igneous rock formation.

4. The method as set forth in claim 1 wherein said second fluid is an aqueous slurry containing a propping agent selected from the group consisting of sand, walnut shells, glass beads, metal pellets, plastics, ceramic granules and mixtures thereof.

5. The method as set forth in claim 2 wherein the igneous rock formation contains chalcopyrite and pyrite.

6. The method as set forth in claim 4 wherein said second fluid further comprises an acidic solution which is capable of reacting with igneous rock in said subterranean igneous rock formation to increase at least the cross-sectional area of said natural fractures.

7. The method as set forth in claim 4 wherein said second fluid further contains an oxidizing agent.

8. The method as set forth in claim 6 wherein said acidic solution comprises a mixture of HF and HCl.

9. The method as set forth in claim 6 wherein said acidic solution comprises a mixture of $H_2SO_4$ and HCl.

10. The method as set forth in claim 7 wherein said oxidizing agent comprises an aqueous solution of ferric sulfate.

11. The method as set forth in claim 4 wherein said second fluid further comprises a mixture of $H_2SO_4$ and $Fe_2(SO_4)_3$.

12. The process for claim 4 wherein the second fluid further contains an oxygenated ammoniacal solution.

* * * * *